United States Patent [19]
Slator et al.

[11] 4,027,816
[45] June 7, 1977

[54] SEAL ASSEMBLY

[75] Inventors: Damon T. Slator; Thomas R. Bishop; Archie W. Peil, all of Houston, Tex.

[73] Assignee: Bowen Tools, Inc.

[22] Filed: Apr. 18, 1975

[21] Appl. No.: 569,370

[52] U.S. Cl. .............................. 277/188 R; 277/205
[51] Int. Cl.² .......................................... F16J 15/24
[58] Field of Search .......... 277/188 R, 188 A, 205, 277/170, 171, 181, 186

[56] References Cited
UNITED STATES PATENTS

| | | | |
|---|---|---|---|
| 2,081,040 | 5/1937 | King | 277/205 |
| 3,521,893 | 7/1970 | Josephson | 277/188 R |

*Primary Examiner*—Robert I. Smith
*Attorney, Agent, or Firm*—Pravel, Wilson & Gambrell

[57] ABSTRACT

An improved seal assembly for sealing between relatively movable members in an oil tool or the like including a split protective ring held in position by a seal ring having a circumferential locking shoulder.

3 Claims, 4 Drawing Figures

SEAL ASSEMBLY

BACKGROUND OF THE INVENTION

The field of this invention is seal assemblies.

One known prior art seal for slidably sealing between reciprocating tool members includes a split ring, a protective ring and O-ring seal. Some difficulty is encountered in installation because the split ring member tends to separate and thus dislocate until actually confined within the tool member. Another problem is a premature loss in sealing effectiveness due to wear of the O-ring.

SUMMARY OF THE INVENTION

It is an object of this invention to provide a new and improved seal assembly for tools which may include rotating or longitudinally reciprocating members wherein one of the tool members has a groove therein for receiving the seal assembly which sealably engages another tool member.

The new and improved seal assembly of a first embodiment of this invention includes a split protective ring adapted for mounting within the groove in one tool member. The split protective ring includes opposing tapered ends which overlap to allow expansion of the split ring. The split ring has an inwardly positioned, radially offset, circumferential ledge.

The new improved seal assembly further includes a seal ring adapted for mounting within the tool member groove and having a circumferential locking shoulder facing inwardly thereof for mounting over the circumferential split protective ring member ledge whereby the split protective ring is held compressed in the groove during assembly of the tool.

The seal ring of the first embodiment of this invention includes a V-shaped end section which forms inner and outer flexible lip portions. The inner flexible lip portion is adapted to engage the inside wall of the groove and outer flexible lip portion is adapted to engage the surface of the other tool member opposing the groove and to provide unidirectional sealing in order to prevent a pressure trap downstream of the seal. The seal ring of the preferred embodiment of this invention further includes means for positioning said seal ring for continuous sealable engagement with the other tool member even after said seal ring has been subjected to wear, thereby increasing the sealing life of the entire seal assembly.

A second embodiment of the present invention provides structure for forming a bidirectional seal between the tool members. This second embodiment includes a pair of split protective rings adapted for mounting in the groove of the first tool member. A seal ring is also provided for mounting in the first tool member groove to sealably engage the second tool member which is adjacent to the groove. Each of the split protective rings has an outwardly facing circumferential ledge, and the seal ring has a plurality of corresponding inwardly facing circumferential locking shoulders to engage the ledges of the split protective rings and hold the split protective rings in the groove when the assembly is mounted with the first tool member. In this manner, the split rings are held in the groove for assembly of the first and second tool members with respect to each other. Further, a bidirectional seal is formed between the assembled tool members.

The seal ring includes an outer compressible, resilient arcuate face for sealably engaging a surface of the second tool member which is adjacent to the first tool member groove. When in sealing engagement with the second tool member, this outer arcuate surface is compressed and conforms to the shape of the surface of the second tool member. Similarly, the seal ring includes an inner compressible, resilient arcuate face for forming a seal between the seal ring itself and the groove of the first tool member. Thus, a bidirectional seal is formed between the first and second tool members.

Further, the seal ring is made of a compressible, resilient material and has an uncompressed, cross sectional radial dimension greater than the distance between the first tool member groove and the surface of the second tool member which is adjacent to that groove. Accordingly, the seal ring is compressed when it is in its mounted position for sealing engagement of the first and second tool members, but the resiliency of the seal ring, along with some outward urging from the split protective rings, causes the seal ring to continuously and sealably engage the second tool member in spite of wear to the seal ring.

DESCRIPTION OF THE PREFERRED EMBODIMENT

Figure 1:
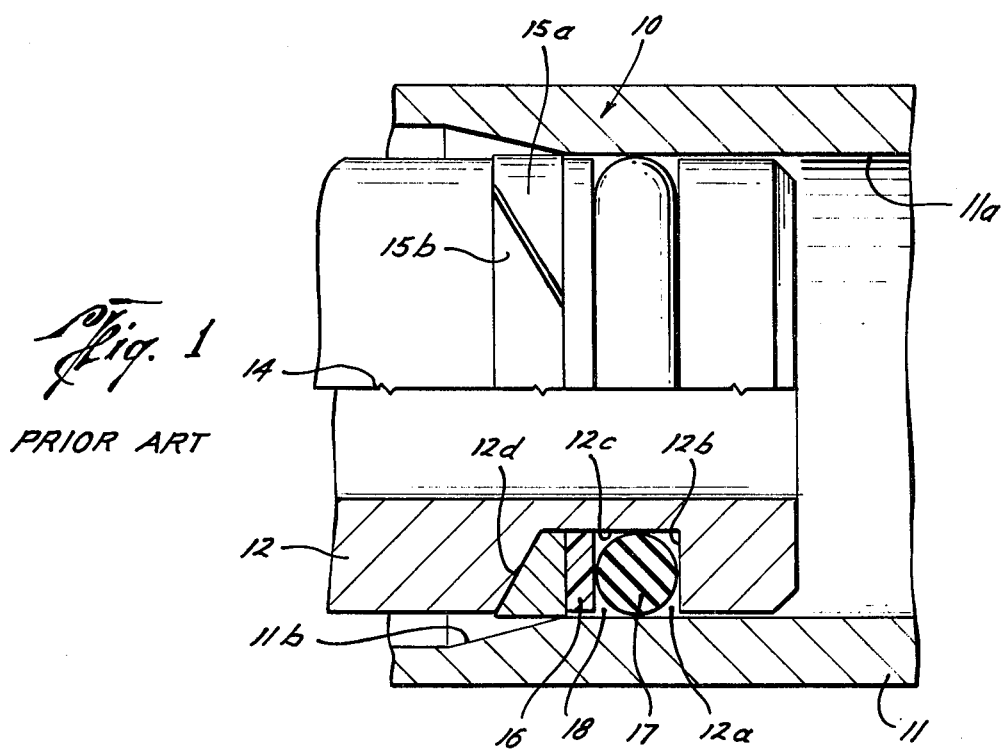
FIG. 1 is a side view partly in section of a seal assembly known in the prior art for providing a seal between tool members which may be relatively moving or reciprocating.

A prior art seal assembly generally designated by the number 10 is illustrated in FIG. 1 of the drawings. The seal assembly 10 is provided for making a slidable, sealable connection between tool members such as 11 and 12. For the purposes of explanation, the tool member 11 will be considered to be stationary with respect to some mounting and the tool member or piston 12 will be considered to be movable by some means along the inner cylindrical wall 11a of the stationary tool member 11. The seal assembly 10 of the prior art is mounted in a groove 12a in the moving or telescoping tool member or piston 12. The groove 12a is formed of a first radially directed surface 12b joined with an inside, circumferential surface 12c, which is joined to a surface 12d. The groove side surface 12d is at an incline or angle with respect to the longitudinal axis 12 of the tool. The prior art seal assembly 10 includes a split ring member 15 that has tapered end portions such as 15a and 15b, which matingly overlap when confined within the groove 12a. The split ring 15 is made of a resilient material which tends to cause the tapered end portion to spread apart; therefore, the split ring must be confined in order to join tapered ends 15a and 15b.

The known seal assembly 10 further includes a separate ring element 16 which is positioned between the split ring member 15 and a common O-ring seal 17.

Due to the necessity of installing the split ring member 15 within the groove 12a, it was generally necessary to provide an outwardly tapered surface 11b in the inside cylindrical wall 11a of the stationary tool member 11 at approximately the point of installation of the seal assembly 10 so that the split rings could be fit and held into place as the entire seal assembly 10 was inserted along with the movable tool member 12 into slidable, sealable engagement with the inside, cylindrical surface 11a of the stationary tool member 11. The ring 16 is known in the art as a "nonextrusion"ring because its principal function is to tightly fit between groove surface 12c and tool member inside wall 11a to prevent the O-ring 17 from being extruded between the split ring 15 and inside wall 11a.

Of course, the actual sealing function of an O-ring seal such as 17 is well known. Generally speaking, whenever a pressure is applied, the O-ring seal 17 tends to distort and fill the gaps or crevice in the area designated as 18 in order to slidably, sealably engage the inside tool member wall 11a. Distortion of the O-ring seal 17 into such confined areas subjects the distorted portion of the O-ring to heavy wear, particularly when the O-ring is providing a sealable engagement between relatively slidable members such as tool members 11 and 12. Of course, if the O-ring becomes damage due to wear (from perhaps a chewing action at the point where the O-ring sealably engages the inside tool member wall 11a), it may be necessary to remove the O-ring and replace it. The inability of the O-ring to compensate for such wear certainly reduces the life of the seal assembly 10.

Figure 2:
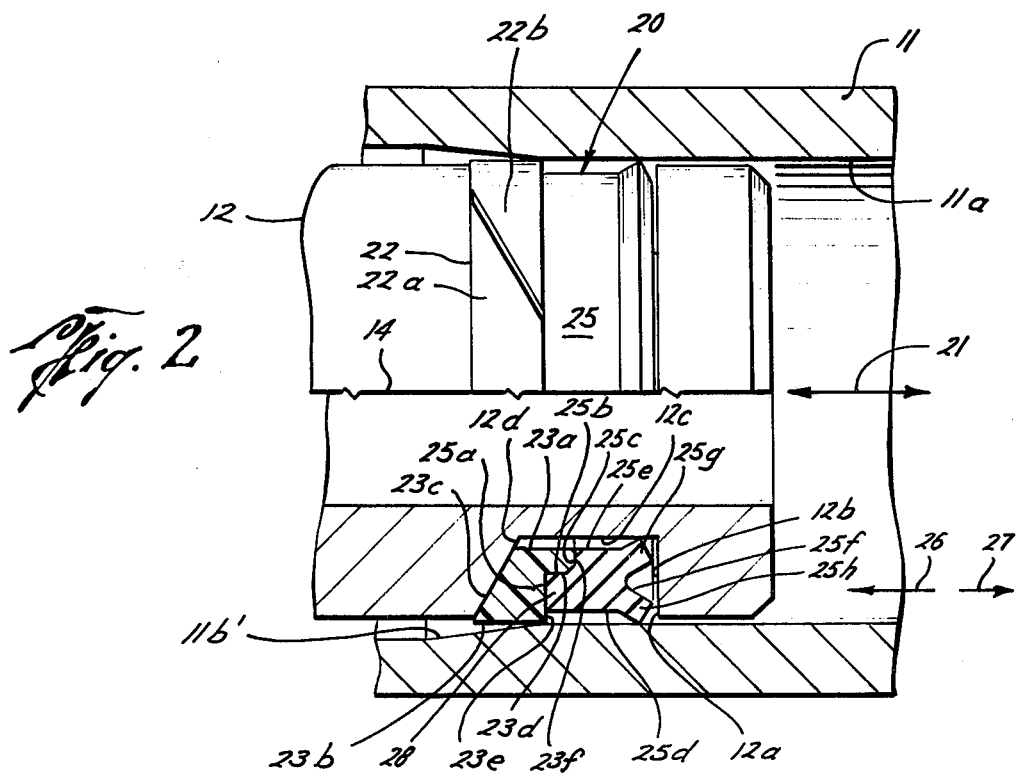
FIG. 2 is a side view partly in section similar to FIG. 1 illustrating the new and improved seal assembly of a preferred embodiment of this invention for providing a unidirectional seal between parts of a tool which may be stationary or relatively moving or reciprocating.

A first embodiment of the new and improved seal assembly generally designated by the numeral 20 is illustrated in FIG. 2 as being mounted within a tool substantially identical to the tool described in FIG. 1, and thus like numerals and letters will be used to describe like parts. Basically the tool elements described in FIG. 2 include the fixed or stationary tool member 11 having an inside cylindrical wall 11a. The tool member 11 has mounted therein a tool member or piston 12. The tool member 12 can be affixed to the tool member 11 such that the seal assembly 20 acts as a static seal, or the tool member 11 may be mounted for reciprocating, slidable movement longitudinally, in the direction of arrow 21, along the inside wall 11a of the stationary tool member 11. Also, it should be understood that the new and improved seal assembly 20 may be used in reciprocating tools wherein the member 12 rotates and/or moves longitudinally with respect to tool member 11.

The tool member 12 has an annular groove 12a therein identical to the groove described in FIG. 1 and thus includes a radially directed wall 12b, an inside circumferential wall 12c and an inclined wall 12c, which is inclined with respect to the longitudinal axis 14 of the tool members 11 and 12. The inside wall 11a of the fixed tool member 11 includes a wall portion 11b', which is tapered outwardly at a more gradual slope with respect to the longitudinal axis line 14 than the tapered wall portion 11b illustrated in FIG. 1. The reduction and perhaps elimination of taper at 11b' is basically the result of the new and improved seal assembly 20.

The seal assembly 20 includes a mating split-ring generally designated as 22. The split-ring 22 is a one-piece unit which is split to form tapered end portions 22a and 22b, respectively, which overlap when the split-ring 22 is mounted within the groove 12a. The split-ring 22 includes an inner circumferential surface 23a and an outer circumferential surface 23b. One side of the split-ring 22 has an inclined surface 23c which is directed at an angle parallel to the angle of groove wall 12d. The other side includes an inwardly positioned or offset, circumferential ledge 23d which acts to join radially directed surface portions 23e and 23f. The radially directed, annular surface portion 23e is joined to the outer, circumferential wall 23b and the radially directed surface 23f is joined to the inner, circumferential wall 23a of the split-ring member 22. The circumferential ledge 23d is positioned radially inwardly with respect to outer, circumferential wall 23b.

The tapered end portions 22a and 22b of the split-ring 22 act to mount the split-ring within the groove 12a of the movable or reciprocating member 12 such that the inwardly positioned ledge 23d on each split-ring end portion 22a and 22b is aligned to provide a continuous, circumferential ledge. The split-ring 22 may be made of materials such as metal or plastic of various known varieties. The split-ring 22 can be opened by separating the end portions 22a and 22b in order to mount the ring over the tool member 12 in the groove 12a. If the ring is made of steel or the like, it must then be compressed or it will tend to expand out the groove 12.

A seal ring 25 is provided for mounting within the groove 12a on the tool member 12 for engaging and holding in position the split-ring 22 and further for sealably engaging the inside cylindrical wall 11a of the tool member 11. The seal ring 25, in cross section, includes a first, radially directed end surface 25a which is joined to an inwardly facing circumferential locking shoulder 25b. The circumferential locking shoulder 25b is joined to a second radially directed end surface 25c. The first radially directed surface 25a joins the outer, substantially circumferential outer wall 25d of the seal ring 25 and the second radially directed surface 25c joins the inner, substantially circumferential wall 25e.

The seal ring 25 further includes a V-shaped section 25f which is formed with inner and outer flexible ear or lip portions 25g and 25h, respectively. The flexible lip portions 25g and 25h are integrally formed with the remainder of the seal ring 25 and are pivotal or flexible with respect to the main body of the seal ring 25. The inner flexible lip portion 25g sealably engages the inside groove wall 12c for preventing the passage of fluid therebetween. The outer flexible lip portion 25h is adapted to slidably, sealably engage the inside tool member wall 11a for unidirectional sealing. That is, assuming fluid pressure in the direction of arrow 26, the flexible lip portion 25h will prevent the passage of such fluid in the direction of arrow 26 but, will allow the passage of fluid in the direction of arrow 27 in order to prevent any type of undesirable fluid build-up and thus prevent the formation of undesirable pockets between the seal ring wall 25d and the inside tool member wall 11a.

The entire seal assembly 20 is usable on practically any kind of tool in order to prevent the passage of fluid between relatively moving or stationary parts. As previously mentioned, it should be understood that the tool member 12 may be rotatingly movable in addition to being longitudinally movable within the tool member 11. The seal assembly 20 of this invention provides a durable, slidable seal between the tool member 11 and 12. If the tool elements 11 and 12 are affixed with respect to each other, the seal assembly 20 acts as a unidirectional static seal. On installation, the split-ring 22 is mounted within the groove 12a for the tool member 12 and then the seal ring 25 is mounted within the groove 12a with the lock shoulder 25d over the circumferential ledge 23d of the mated split-ring 22. In this manner, the split-ring 22 is maintained within the groove 12a during assembly. This is an improvement over the prior art wherein the split-ring end portions tend to separate until the entire seal assembly is fully positioned totally within and confined by the tool member 11.

During use, the seal ring 25 is pushed by pressure from the direction of arrow 26 radially outwardly against the tool wall 11a. In particular, the end portion generally designated as 28 is shifted or distorted into slidable, sealable engagement with the inside, cylindrical tool member wall 11a thus providing for slidable, sealable movement therebetween. After some period of use, this sealing portion 28 will begin to wear. However, as this sealing portion 28 wears away, the entire seal ring 25 is shifted radially outwardly so that a part of the seal ring 28 continually engages the tool wall 11a. This replacement action, which can be attributed to the cross sectional configuration of the seal ring 25, including the large end area of end 25f which receives pressure, provides the entire seal assembly 20 with a much longer life.

Figure 3:
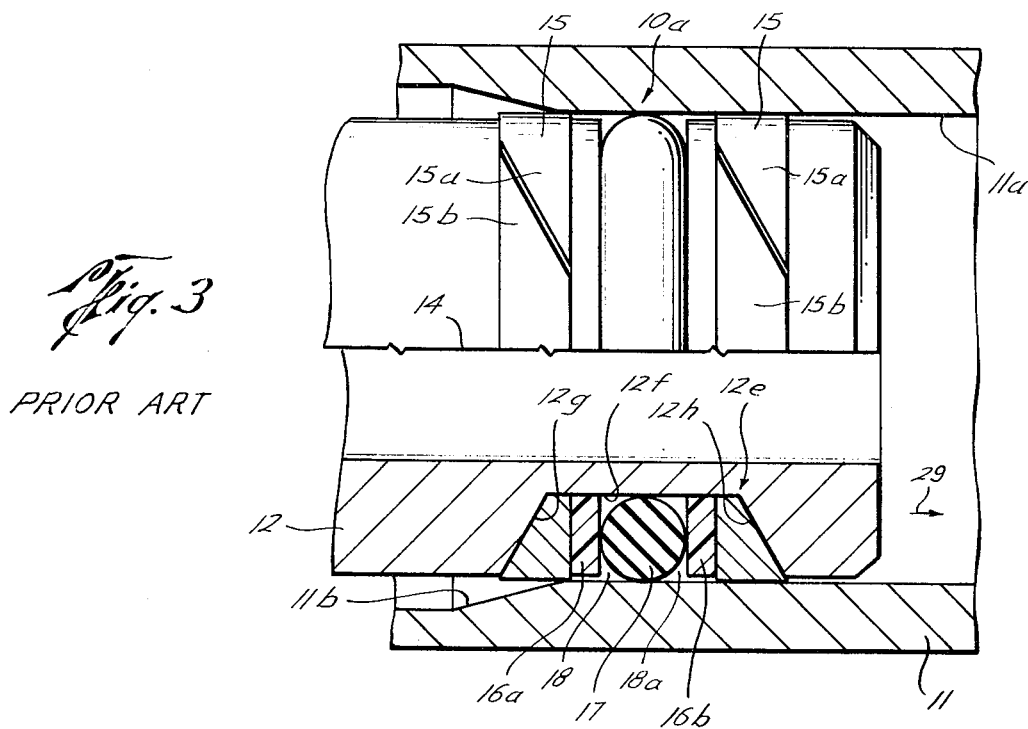
FIG. 3 is a side view partly in section of a seal assembly known in the art for bidirectional sealing using tandem non-extrusion rings.

A prior art bidirectional seal assembly designated generally as 10a is illustrated in FIG. 3 of the drawings. As many of the elements of bidirectional seal 10a are substantially identical to the elements of the unidirectional prior art seal 10, like numerals have been used in FIGS. 1 and 3 to indicate corresponding elements of the two prior art seals.

As can be seen in FIG. 3, the known bidirectional seal 10a is mounted in a groove 12e formed by a circumferential surface 12f which is joined by two slanted groove surfaces 12g and 12h. The groove surfaces 12g and 12h are at opposing inclines or angles with respect to the longitudinal axis 14 of tool member 12 so that the groove 12e, when viewed in cross section, has a substantially truncated triangular shape.

The prior art seal 10a includes a pair of split rings 15, each of which has tapered end portions 15a and 15b which matingly overlap when confined within the groove 12a. As was true with the known unidirectional seal 10, the split rings 15 of the known bidirectional seal 10a may be made of a resilient material which tends to cause the tapered end portions 15a and 15b to spread apart. Each of the split rings 15 must be confined in order to join the tapered ends 15a and 15b of the respective split ring.

The known bidirectional seal 10a additionally includes an O-ring seal 17 between split rings 15. A pair of non-extrusion rings 16a and 16b are mounted on opposing sides of seal ring 17 and between the seal ring the split rings 15.

To install the known bidirectional seal 10a, the split rings 15 had to be fit into groove 12e and held in place as the entire seal assembly 10a was inserted along the movable tool member 12 into sealing engagement with the inside cylindrical surface 11a of the stationary tool member 11. It was generally necessary to provide the enlarged outwardly tapered surface 11b on the inside cylindrical wall 11a of tool member 11 to facilitate this installation of the seal assembly 10a.

Once installed, the actual sealing function of the bidirectional seal 10a is analogous to that of the unidirectional seal 10 illustrated in FIG. 1. When a pressure is applied, the O-ring seal tends to distort and seal the gaps or crevices 18 or 18a. The particular gap sealed by the seal ring 17 depends, of course, upon the direction in which the pressure is applied. In response to a pressure in the direction of arrow 29, seal ring 17 distorts and tends to fill gap 18a. In response to a pressure in the opposite direction, the seal ring 17 distorts and tends to seal gap 18.

The repeated distortion of seal ring 17, especially in opposite directions, causes a significant amount of wear to the seal ring 17. Accordingly, it may be necessary to remove the seal assembly 10a and replace the O-ring more frequently than is desired. This inability of the known bidirectional seal 10a to compensate for the wear of seal ring 17 reduces the life of the seal assembly 10a and increases the expenditures of time, money and manpower required to maintain a seal between the tool members 11 and 12.

Figure 4:
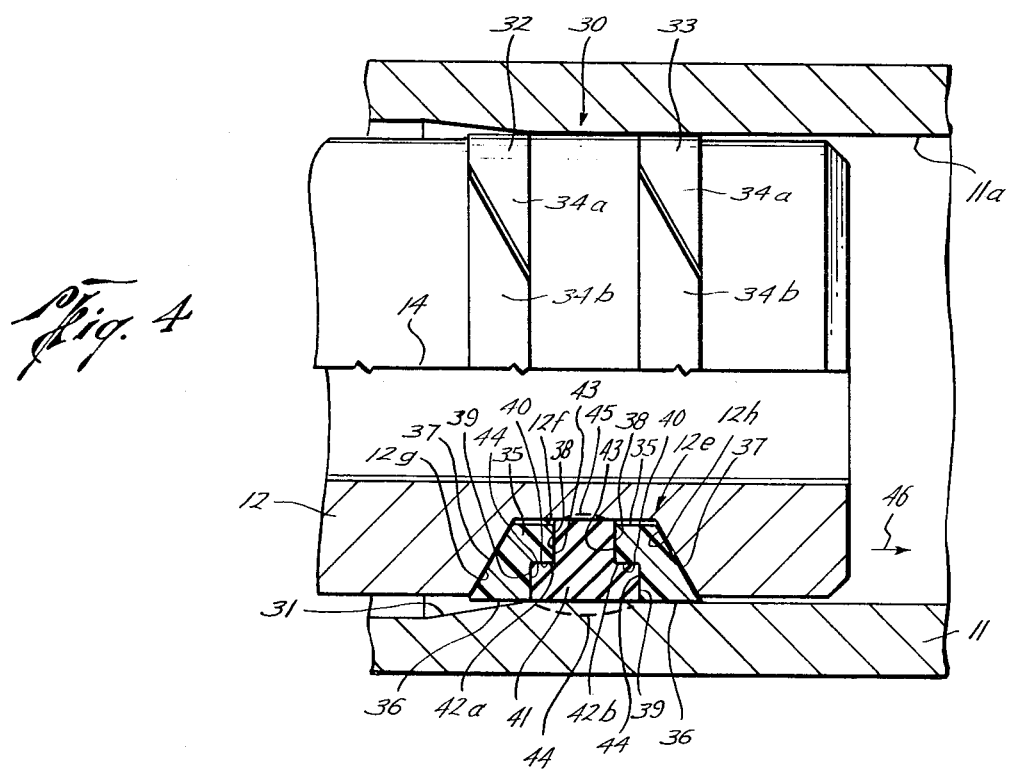
FIG. 4 is a side view partly in section of a new and improved bidirectional seal assembly.

The second embodiment of the new and improved seal assembly of the present invention is designated generally by the numeral 30 in FIG. 4. The bidirectional seal assembly 30 is illustrated as being mounted with a tool substantially identical to the tools described in FIG. 3, and like numerals and letters are used to describe the corresponding structural components in FIGS. 3 and 4. Briefly, the tool elements depicted in FIG. 4 include the fixed or stationary tool member 11 having an inside cylindrical wall 11a. A second tool member or piston 12 is adapted for mounting or assembly with tool member 11. The tool member 12 can be affixed to tool member 11 such that the seal assembly 30 acts as a static seal, or the tool member 11 may be mounted for reciprocating, slidable movement longitudinally along the inside wall 11a of tool member 11. Also, it should be understood that seal assembly 30 may be used in reciprocating tools where the tool member 12 rotates and/or moves longitudinally with respect to tool member 11.

Tool member 11 has an annular groove 12e identical to that depicted in FIG. 3. Thus, the groove 12e includes an inner circumferential surface 12f and a pair of inclined side surfaces 12g and 12h which join the circumferential surface 12f. The inside wall 11a of the fixed tool member 11 includes an outwardly tapered wall portion 31 which has a more gradual slope with respect to the longitudinal axis line 14 than does the tapered wall portion 11b illustrated in FIG. 3. As will be evident from the description of seal assembly 30 set forth below, the seal assembly 30 makes it possible to use the more gradually inclined surface 31 during the installation of a bidirectional seal. Among other advantages, the provision of a more gradually sloping surface 31 increases the strength and stability of tool member 11 because less of the material forming the tool member need be cut away in order to permit installation of the bidirectional seal.

The seal assembly 30 includes a pair of mating split rings 32 and 33. Each of the split rings is a onepiece unit which is split to form tapered end portions 34a and 34b. The tapered end portions overlap when the split rings 32 and 33 are mounted within the groove 12e.

Each of the split rings 32 and 33 has an inner circumferential surface 35 and an outer circumferential surface 36. Additionally, each of the split rings includes an inclined side surface 37. As can be seen from FIG. 4, when the split rings 32 and 33 are mounted in grooves 12e, the inner circumferential surface 35 of the split rings is adjacent the inner circumferential surface 12f of the groove 12e, the outer circumferential surface 36 is adjacent to the inner circumferential wall 11a of tool member 11, and the inclined side surface 37 of each seal ring is adjacent to the corresponding inclined surfaces 12g and 12h of the groove 12e.

Additionally, each of the split rings 32 and 33 is provided with a first radial surface 38 and a second radial surface 39. These radial surfaces 38 and 39 of each of the split rings are joined by an outwardly facing circumferential ledges 40, which extend toward each other. The circumferential ledge 40 of each ring facilitates the mounting of seal assembly 30 on the tool member 12 and permits rapid and easy installation of the seal assembly with the tool members 11 and 12.

A seal ring 41 is provided with a pair of inwardly facing circumferential shoulders 42a and 42b which engage the circumferential ledges 40 of the split rings 32 and 33. Additionally, the seal ring 41 is provided with a pair of inner radial surfaces 43 and a pair of outer radial surfaces 44. As can be seen from FIG. 4, when the split rings 32 and 33 and the seal ring 41 are mounted in groove 12e, the inner radial surfaces 43 engage the first radial surfaces 38 of the split rings and the outer radial surfaces 44 engage the second radial surfaces 39 of the split rings. Further, the locking shoulders 42a and 42b of the seal ring 41 engage the circumferential ledges 40 of the split rings 32 and 33 so that the split rings are held in place in groove 12e by the seal ring 41. This is a significant advantage because it permits the seal assembly 30 to be held in place on tool member 12 as the tool members 11 and 12 are assembled with respect to one another. Unlike the known seal assemblies, any separating or outwardly urging force from the split rings 32 and 33 does not disengage the seal assembly from the groove 12e. Rather, the split rings 32 and 33 are held in groove 12e by the seal ring 41 so that the tool members 11 and 12 may be easily assembled.

The seal ring 41 sealably engages the inner circumferential surface 11a of tool member 11 adjacent to the groove 12e. The seal ring 41 thus forms a bidirectional seal between the two tool members 11 and 12. Preferably, seal ring 41 is formed of a compressible, resilient material. When the seal ring 41 is not compressed, it has a cross sectional radial dimension which is in excess of the distance between the inner circumferential groove surface 12f and the circumferential surface 11a of tool member 11. That is, when the seal ring is not compressed, the distance between its outer sealing surface 44 and its inner sealing surface 45 is in excess of the distance from circumferential surface 12f to circumferential surface 11a. When the seal ring 41 is mounted in groove 12e and engages the inner surface 11a of tool member 11, the sealing ring 41 is compressed.

As indicated by the dashed lines 44 and 45, both the inner and outer sealing surfaces of seal ring 41 are normally arcuate in shape when they are not compressed. However, when the seal assembly 31 is mounted between the assembled tool member 11 and 12, both the sealing surface 44 and the sealing surface 45 are compressed and conform to the shapes of surfaces 11a and 12f, respectively. In this compressed state, the sealing surface 44 forms a bidirectional seal with the inner circumferential surface 11a of tool member 11. Thus, surface 44 prevents the passage of fluid between the tool member 11 and the seal 41. The inner sealing surface 45 forms a bidirectional seal between the seal 41 and the inner circumferential ledge 12f of the groove 12e. This inner bidirectional seal prevents the passage of fluid between the seal member 41 and the tool member 12. Accordingly, a complete bidirectional seal is formed between the tool members 11 and 12.

The seal assembly 30 provides a bidirectional seal between tool members 11 and 12 which is very effective. The resilient sealing surfaces 44 and 45 have a normally arcuate shape in their uncompressed state and tend to return to that shape when uncompressed. This facilitates the forming of the bidirectional seal between the tool members and, at the same time, it tends to reduce the wear on seal ring 41.

By way of explanation only, not limitation, the function of seal ring 41 can be described as follows. When a pressure is applied in the direction of arrow 46, the lefthand edge of sealing surface 44 may be lifted slightly from the surface 11a. However, the resilience of the seal ring 41 and the normally arcuate shape of the sealing surface 44 causes the righthand edge of the sealing surface to even more firmly engage surface 11a in response to this pressure. Similarly, when a pressure is applied in the direction opposite to the arrow 46, the righthand side of surface 44 may be lifted slightly and the lefthand side of the surface 44 will even more firmly engage the surface 11a in response to that lifting force. The inner sealing surface 45 responds in a corresponding way to any fluid pressures exerted parallel to the inner circumferential surface 12f of groove 12e. Further, since the radial dimension of seal ring 41 is greater than the distance from surface 12f to surface 11a and since the seal 41 is made of a resilient material, the seal ring 41 tends to return to its uncompressed state and continues to sealably engage surfaces 12f and 11a despite wear to the seal ring surfaces 44 and 45. Thus, the seal ring assembly 30 forms a very effective bidirectional seal between tool members 11 and 12 and is also resistant to wear of the seal ring 41.

The foregoing disclosure and description of the invention are illustrative and explanatory thereof, and various changes in the size, shape and materials as well as in the details of the illustrated construction may be made without departing from the spirit of the invention.

We claim:

1. A seal assembly for tool members wherein one of said tool members has a groove therein for receiving said seal assembly for sealably engaging another tool member, comprising:

a split protective ring for mounting in an annular groove in a first tool member, said split protective ring including tapered end portions that overlap in said groove, said ring having an inwardly positioned circumferential ledge; and a seal ring for mounting in said annular groove, said seal ring having first and second radially directed surfaces and a circumferential locking shoulder facing inwardly for mounting over said circumferential split protective ring ledge, whereby said split protective ring is held in said groove in said first tool member even during assembly of said tools, and said seal ring is adapted to sealably engage a second tool member mounted for relative movement with respect to said first tool member.

2. The structure set forth in claim 1, including:
said split protective ring having a side formed of first and second radially directed surfaces joined by said inwardly positioned circumferential ledge, said first and second radially directed surfaces of said seal ring being respectively positioned adjacent to said first and second radially directed surfaces of said split protective ring with said locking shoulder of said seal ring in engagement with said circumferential ledge of said split protective ring.

3. The structure set forth in claim 1, including:
said seal ring having a first end portion that includes said first and second radially directed surfaces and said circumferential locking shoulder and a second end portion which is V-shaped and includes first and second flexible lip portions, said first lip portion engaging said groove and said second lip portion engaging said other tool member to provide unidirectional sealing action between said members; and said split protective ring formed with a side portion including first and second radially directed surfaces joined by said inwardly positioned circumferential ledge.

* * * * *